United States Patent [19]

Masumoto et al.

[11] 4,082,579

[45] Apr. 4, 1978

[54] RECTANGULAR HYSTERESIS MAGNETIC ALLOY

[75] Inventors: Hakaru Masumoto, Sendai; Yuetsu Murakami, Izumi; Naoji Nakamura, Sendai, all of Japan

[73] Assignee: The Foundation: The Research Institute of Electric and Magnetic Alloys, Japan

[21] Appl. No.: 737,054

[22] Filed: Oct. 29, 1976

Related U.S. Application Data

[63] Continuation-in-part of Ser. No. 548,977, Feb. 11, 1975, abandoned.

[51] Int. Cl.[2] .............................................. C04B 35/00

[52] U.S. Cl. ................................ 148/31.55; 75/123 J; 148/120; 148/121

[58] Field of Search .................... 75/123 J; 148/31.55, 148/120, 121, 155

[56] References Cited

U.S. PATENT DOCUMENTS

| | | | |
|---|---|---|---|
| 1,715,541 | 6/1929 | Elmen | 148/31.55 |
| 1,904,859 | 4/1933 | Dean | 75/123 J |
| 3,124,470 | 3/1964 | Schmeckenbecher | 148/31.55 |
| 3,794,530 | 2/1974 | Masumoto et al. | 148/31.55 |

OTHER PUBLICATIONS

Bozorth, R.; *Ferro Magnetism;* New York, 1951, pp. 253-254.

*Primary Examiner*—Walter R. Satterfield
*Attorney, Agent, or Firm*—Hill, Gross, Simpson, Van Santen, Steadman, Chiara & Simpson

[57] ABSTRACT

A rectangular hysteresis magnetic alloy consisting of 0.5-25 wt. % of Ta and the balance of Fe and a rectangular hysteresis magnetic alloy consisting of 0.5-25 wt. % of Ta, 0.01-60 wt. % in total amount of at least one element selected from the group consisting of 0-10% of V, 0-0.5% of Nb, 0-35% of Cr, 0-20% of Mo, 0-20% of W, 0-25% of Ni, 0-25% of Cu, 0-40% of Co, 0-5% of Ti, 0-5% of Zr, 0-5% of Si, 0-10% of Al, 0-5% of Ge, 0-5% of Sn, 0-5% of Sb, 0-3% of Be, 0-15% of Mn, 0-2% of Ce and 0-1.5% of C, and the balance of Fe have an excellent rectangular hysteresis loop, a coercive force of more than 2 oerstads, excellent forgeability and workability, and are particularly suitable as a magnetic material for electromagnetic devices requiring rectangular hysteresis loop.

9 Claims, 2 Drawing Figures

RECTANGULAR HYSTERESIS MAGNETIC ALLOY

CROSS-REFERENCE TO RELATED APPLICATION

This application is a continuation-in-part of our copending U.S. patent application Ser. No. 548,977 filed Feb. 11, 1975 and now abandoned.

BACKGROUND OF THE INVENTION

The present invention relates to a rectangular hysteresis magnetic alloy consisting of iron and tantalum, and more particularly to a rectangular hysteresis magnetic alloy consisting of iron and tantalum as main ingredients and at least one element selected from the group consisting of vanadium, niobium, chromium, molybdenum, tungsten, nickel, copper, cobalt, titanium, zirconium, silicon, aluminum, germanium, tin, antimony, beryllium, manganese, cerium and carbon as subingredients.

At present, magnetic alloys exhibiting a rectangular hysteresis loop and having high residual induction and coercive force of more than 2 oersteds are usually used as a magnetic material for memory elements, ferreed switches, latching relays and the like in electromagnetic devices. The manufacture of these articles may require a high temperature working operation such as glass sealing and the like. Therefore, it is desired that these alloys have a good workability and stable magnetic properties even at an elevated temperature (about 800° C).

As the magnetic material satisfying such requirements, there have been used iron-carbon series alloy, iron-manganese series alloy, iron-cobalt series alloy, iron-nickel series alloy and the like. In the Fe-C and Fe-Mn series alloys, however, the magnetic properties are considerably degraded by heating at an elevated temperature although they are cheap and have a good workability. On the other hand, the Fe-Co and Fe-Ni series alloys contain large amounts of expensive cobalt and nickel, respectively, and require a high working operation, so that they are economically unsatisfactory.

SUMMARY OF THE INVENTION

Therefore, an object of the present invention is to provide magnetic alloys having excellent rectangular hysteresis loop, high residual induction, high forgeability and high workability.

The inventors have made various investigations on magnetic alloys having a rectangular hysteresis loop and found that alloys comprising iron and tantalum, as will be mentioned hereinafter, exhibit an excellent rectangular hysteresis loop and have high residual induction, high forgeability and stable magnetic properties even at an elevated temperature.

Namely, the present invention provides magnetic alloys having an excellent rectangular hysteresis loop and a coercive force of more than 2 oersteds. These alloys are preferably useful as magnetic materials in the form of a thin wire or sheet for the manufacture of the above described electromagnetic devices requiring a rectangular hysteresis loop.

According to one embodiment of the present invention, the magnetic alloy consists of 0.5–25% by weight of tantalum and the balance of iron and contains a small amount of impurities. The preferable alloy consists of 2–20% by weight of tantalum and the balance of iron.

According to another embodiment of the present invention, the magnetic alloy consists of 0.5–25% by weight of tantalum, 0.01–60% by weight in total amount of at least one element selected from the group consisting of 0–10% of vanadium, 0–0.5% of niobium, 0–35% of chromium, 0–20% of molybdenum, 0–20% of tungsten, 0–25% of nickel, 0–25% of copper, 0–40% of cobalt, 0–5% of titanium, 0–5% of zirconium, 0–5% of silicon, 0–10% of aluminum, 0–5% of germanium, 0–5% of tin, 0–5% of antimony, 0–3% of beryllium, 0–15% of manganese, 0–2% of cerium and 0–1.5% of carbon and the balance of iron and contains a small amount of impurities. The preferable alloy of this embodiment consists of 2–20% by weight of tantalum, 0.01–60% by weight in total amount of at least one element selected from the group consisting of 0–7% of vanadium, 0–0.5% of niobium, 0–20% of chromium, 0–10% of molybdenum, 0–10% of tungsten, 0–20% of nickel, 0–7% of copper, 0–30% of cobalt, 0–3% of titanium, 0–3% of zirconium, 0–3% of silicon, 0–3% of aluminum, 0–3% of germanium, 0–3% of tin, 0–3% of antimony, 0–2% of beryllium, 0–7% of manganese, 0–1.5% of cerium and 0–1% of carbon and the balance of iron.

In order to make the magnetic alloy of the present invention, suitable amounts of starting materials comprising 0.5–25 wt. % of Ta and the balance of Fe are first melted in a suitable melting furnace in air, preferably in a non-oxidizing atmosphere or in a vacuum. Alternately, a given amount of 0.01–60 wt. % in total amount of at least one element selected from the group consisting of 0–10% of V, 0–0.5% of Nb, 0–35% of Cr, 0–20% of Mo, 0–20% of W, 0–25% of Ni, 0–25% of Cu, 0–40% of Co, 0–5% of Ti, 0–5% of Zr, 0–5% of Si, 0–10% of Al, 0–5% of Ge, 0–5% of Sn, 0–5% of Sb, 0–3% of Be, 0–15% of Mn, 0–2% of Ce and 0–1.5% and C may be added as subingredients together with iron and tantalum. Then, the resulting molten mass is added with a small amount (less than 1%) of a deoxidizer and desulfurizer such as manganese, silicon, aluminum, titanium, calcium alloy, magnesium alloy and the like to remove impurities therefrom as far as possible, and thoroughly stirred to obtain a molten alloy having a homogeneous composition.

Next, the thus obtained molten alloy is poured into a mold having an adequate shape and size to form a sound ingot. This ingot is made into a suitable form, for example a rod or a plate by forging or hot working at an elevated temperature and if necessary, annealed at a temperature above 400° C. Then the rod or plate is subjected to cold working in a working ratio of more than 50% by swaging, drawing, rolling or the like to form an article of a desired form, for example a wire having a diameter of 0.5–1 mm or sheet having a thickness of 0.1–0.2 mm. The thus cold worked article is heated at a temperature above 400° C in air, preferably in a non-oxidizing atmosphere or in a vacuum to obtain a cold worked, heat treated magnetic alloy having an excellent rectangular hysteresis loop and a coercive force of more than 2 oersteds.

The above mentioned cold working acts to make the preferred orientation of alloy crystal even, and particularly the effect by the cold working is remarkable at a working ratio of more than 50%. Furthermore, the heating which follows the cold working serves to improve the rectangular hysteresis loop through removal of working strain, recrystallization, transformation precipitation and the like, and particularly the effect by the heating is remarkable at a temperature above 400° C.

DESCRIPTION OF THE PREFERRED EMBODIMENTS

The following examples are given in illustration of this invention and are not intended as limitations thereof.

EXAMPLE 1

Preparation of Fe-Ta Alloy Specimen No. 4 (Composition Fe : 94%, Ta : 6%)

As a starting material, electrolytic iron of 99.9% purity and tantalum of 99.8% purity were used. The starting materials were charged in a total amount of 700g into an alumina crucible and melted in a high frequency induction electric furnace in air and then thoroughly stirred to obtain a homogeneous molten alloy. Then, the molten alloy was poured into a mold having a hole of 25 mm diameter and 170 mm height to form an ingot. This ingot was forged at about 1000° C to a rod of 4 mm diameter, which was annealed at 1000° C for 1 hour, cooled with water and then cold drawn to a wire of 0.5 mm diameter. In this case, the working ratio (reduction of area) was 98%. The thus obtained wire is cut to lengths of 1 m with each length being wound in a coil to form a specimen. Then, the specimens were subjected to several heat treatments to obtain characteristic features of coercive force Hc, residual induction Br and squareness ratio ($Br/B_{100}$) as shown in the following Table 1.

The term "squareness ratio" used herein is expressed by a percentage of residual induction Br to magnetic flux density $B_{100}$ when the magnetic field is 100 oersteds (i.e. $Br/B_{100} \times 100$) unless indicated otherwise. For some of the alloys the "squareness ratio" is $Br/B_{200}$ wherein the magnetic flux density $B_{200}$ is created by a magnetic field of 200 oersteds.

Table 1

| Heat treatment | Coercive force Hc(Oe) | Residual induction Br(G) | Squareness ratio $Br/B_{100}$ (%) |
|---|---|---|---|
| Cold worked at a working ratio of 98% | 36 | 12,000 | 77.2 |
| After heated at 450° C for 10 hours in a vacuum, cooled in furnace | 18 | 15,200 | 84.0 |
| After heated at 700° C for 2 hours in a vacuum, cooled in furnace | 30 | 15,800 | 97.8 |
| After heated at 850° C for 1 hour in a vacuum, cooled in furnace | 22 | 15,100 | 95.1 |
| After heated at 1,100° C for 1 hour in a vacuum, cooled in furnace | 12 | 13,800 | 90.5 |

Figure 1:
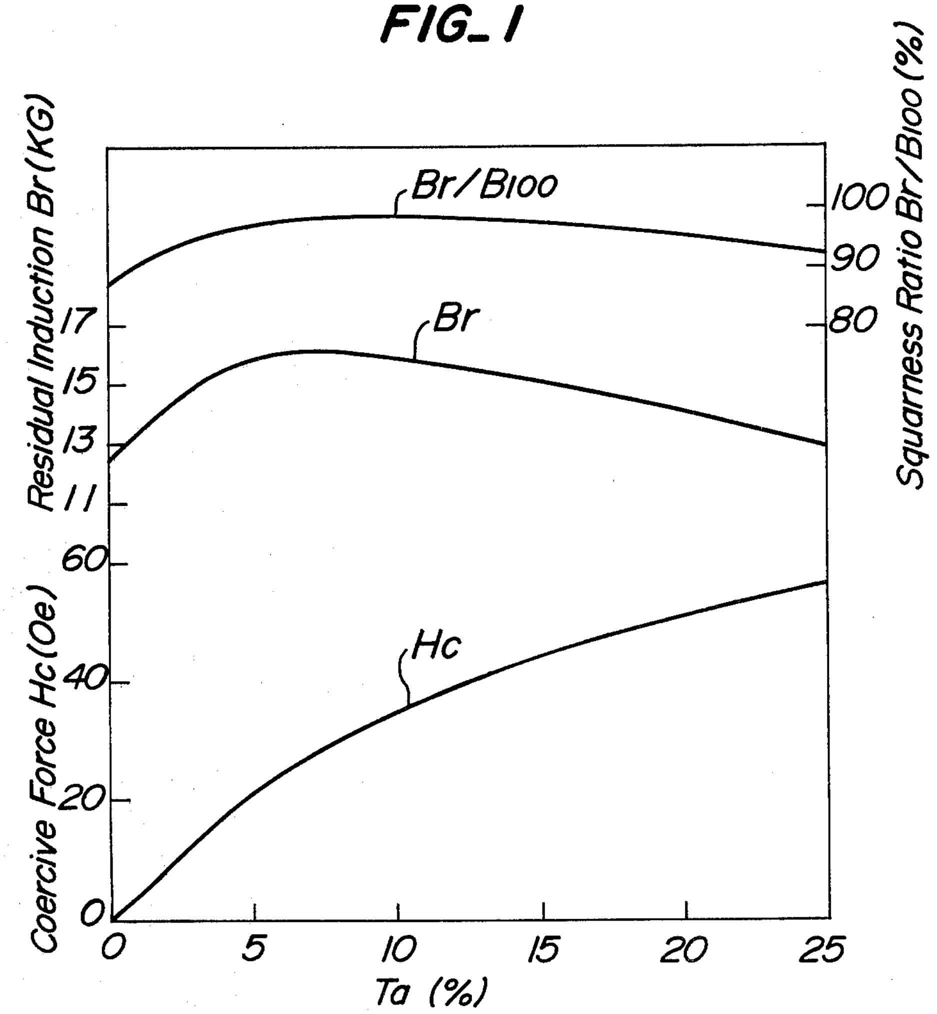
FIG. 1 is a graph showing magnetic properties of iron-tantalum alloys which contain different amounts of tantalum which alloys were subjected to cold working at a working ratio of 98% and then heated at 650° C for 2 hours.

FIG. 1 shows the coercive force Hc, residual induction Br and squareness ratio $Br/B_{100}$ of Fe-Ta alloys which contain variable amounts of tantalum when each alloy is cold worked at a working ratio of 98% and heated at 650° C in a vacuum for 2 hours. As seen from this figure, the larger tantalum content will increase the coercive force, but reduces the residual induction. The squareness ratio is more than 90% independent of the tantalum content. However, when the tantalum content is less than 0.5%, the coercive force is less than 2 oersteds, and when the content exceeds 25%, the working of the alloy is difficult.

Figure 2:
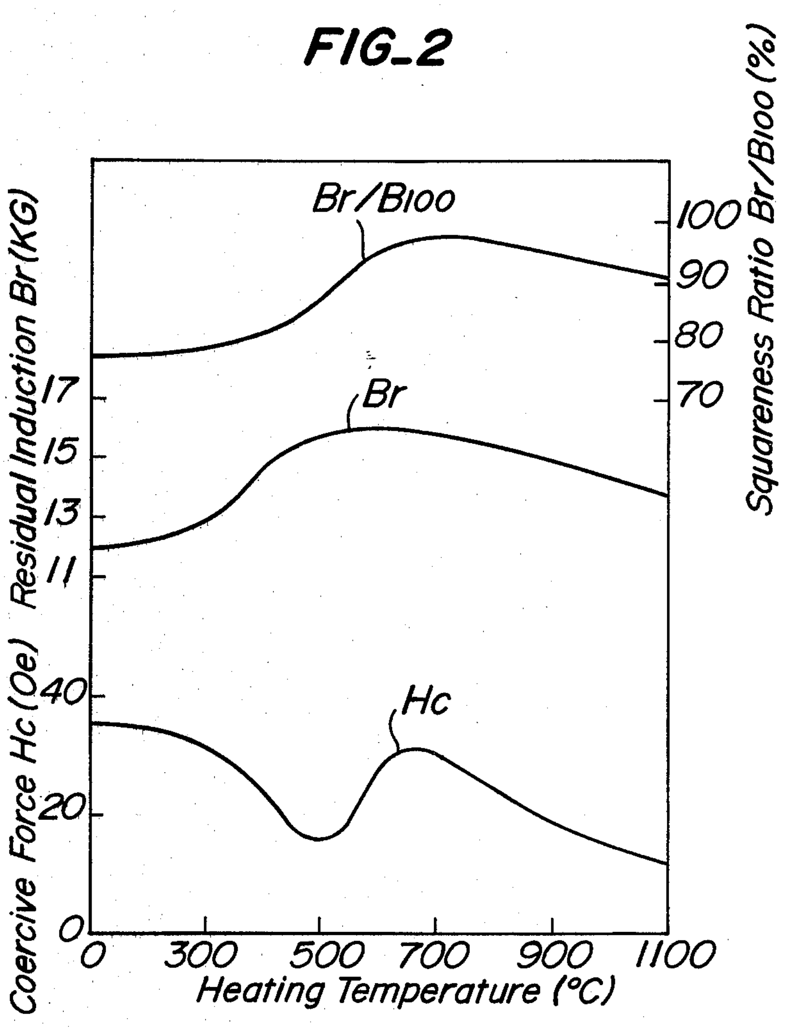
FIG. 2 is a graph showing magnetic properties of iron-tantalum alloy containing 6% Ta when it is subjected to cold working at a working ratio of 98% and then heated for 2 hours at various temperatures.

FIG. 2 shows the coercive force Hc, residual induction Br and squareness ratio $Br/B_{100}$ of a Fe-Ta alloy which contains 6% tantalum when the alloy is cold worked at a working ratio of 98% and then heated at various temperatures for 2 hours. As seen from this figure, the squareness ratio is more than 80% when the heating is carried out at a temperature above 400° C and less than 80% when the heating is carried out at a temperature below 400° C. The latter case becomes unsuitable as a magnetic alloy requiring a rectangular hysteresis loop. One of the features of the cold worked, heat treated alloy of the present invention is that the squareness ratio is more than 80% even in the heating at an elevated temperature.

EXAMPLE 2

Preparation of Alloy Specimen No. 91 (Composition Fe : 79.7%, Ta : 6.5%, Ni : 13.8%).

As a starting material, iron and tantalum of the same impurities as in Example 1 and nickel of 99.9% purity were used. The specimen was prepared in the same manner as described in Example 1. The specimen was subjected to several heat treatments to obtain characteristic features as shown in the following Table 2.

Table 2

| Heat treatment | Coercive force Hc(Oe) | Residual induction Br(G) | Squareness ratio $Br/B_{100}$ (%) |
|---|---|---|---|
| Cold worked at a working ratio of 98% | 48 | 11,700 | 76.5 |
| After heated at 450° C for 10 hours in a vacuum, cooled in furnace | 36 | 13,800 | 84.2 |
| After heated at 600° C for 5 hours in a vacuum, cooled in furnace | 52 | 14,500 | 96.5 |
| After heated at 900° C for 1 hour in a vacuum, cooled in furnace | 27 | 13,400 | 93.1 |
| After heated at 1,100° C for 1 hour in a vacuum, cooled in furnace | 15 | 12,700 | 90.2 |

EXAMPLE 3

Preparation of Alloy Specimen No. 158 (Composition Fe : 87.4%, Ta : 8.6%, Al : 4.0%)

As a starting material, iron and tantalum of the same purities as in Example 1 and aluminum of 99.8% purity were used. The specimen was prepared in the same manner as described in Example 1. The specimen was subjected to several heat treatments to obtain characteristic features as shown in the following Table 3.

Table 3

| Heat treatment | Coercive force Hc(Oe) | Residual induction Br(G) | Squareness ratio $Br/B_{100}$ (%) |
|---|---|---|---|
| Cold worked at a working ratio of 98% | 44 | 11,800 | 79.1 |
| After heated at 500° C | | | |

Table 3-continued

| Heat treatment | Coercive force Hc(Oe) | Residual induction Br(G) | Squareness ratio $Br/B_{100}$ (%) |
|---|---|---|---|
| for 20 hours in a vacuum, cooled in furnace | 21 | 15,000 | 86.6 |
| After heated at 750° C for 3 hours in a vacuum, cooled in furnace | 40 | 15,200 | 97.3 |
| After heaed at 900° C for 1 hour in a vacuum, cooled in furnace | 35 | 14,900 | 93.5 |
| After heated at 1,100° C for 30 minutes in a vacuum, cooled in furnace | 17 | 14,000 | 91.2 |

Moreover, characteristic features of representative alloys of the present invention are shown in the following Tables 4 and 5.

Table 4

| Specimen No. | Composition (%) Fe | Ta | | | Cold working ratio (%) | Heating temperature (° C) | Heating time (hr) | Coercive force Hc(Oe) | Residual induction Br(G) | Squareness ratio $Br/B_{100}$ (%) |
|---|---|---|---|---|---|---|---|---|---|---|
| 8 | 94.0 | 6.0 | | — | 98 | 700 | 2 | 30 | 15,800 | 97.8 |
| 16 | 87.5 | 12.5 | | — | 95 | 650 | 5 | 41 | 15,500 | 97.2 |
| 30 | 79.7 | 20.3 | | — | 93 | 700 | 5 | 51 | 14,200 | 96.3 |
| 52 | 85.6 | 10.6 | V | 3.8 | 98 | 720 | 3 | 38 | 15,100 | 95.8 |
| 63 | 88.0 | 21.6 | Nb | 0.4 | 95 | 700 | 7 | 45 | 15,600 | 97.0 |
| 70 | 80.6 | 12.0 | Cr | 12.0 | 99 | 650 | 3 | 38 | 14,000 | 97.4 |
| 76 | 83.5 | 12.0 | Mo | 4.4 | 98 | 650 | 10 | 48 | 14,700 | 96.7 |
| 84 | 85.9 | 8.1 | W | 6.0 | 95 | 700 | 7 | 46 | 15,000 | 97.5 |
| 91 | 79.7 | 6.5 | Ni | 13.8 | 98 | 600 | 5 | 52 | 14,500 | 96.5 |
| 100 | 82.7 | 13.3 | Cu | 4.0 | 93 | 630 | 2 | 63 | 15,100 | 95.7 |
| 111 | 80.8 | 4.0 | Co | 15.2 | 95 | 650 | 5 | 45 | 16,200 | 96.6 |
| 120 | 87.8 | 10.7 | Ti | 1.5 | 95 | 700 | 2 | 40 | 15,500 | 97.3 |
| 132 | 89.7 | 9.3 | Zr | 1.0 | 95 | 700 | 5 | 38 | 15,600 | 97.1 |
| 145 | 90.0 | 7.9 | Si | 2.1 | 95 | 720 | 5 | 42 | 15,400 | 97.5 |
| 158 | 87.4 | 8.6 | Al | 4.0 | 98 | 750 | 3 | 40 | 15,200 | 97.3 |
| 167 | 91.6 | 5.4 | Ge | 3.2 | 98 | 700 | 3 | 28 | 15,800 | 96.8 |
| 180 | 87.5 | 11.3 | Sn | 1.2 | 95 | 650 | 5 | 45 | 15,300 | 97.5 |
| 189 | 86.5 | 12.5 | Sb | 1.0 | 95 | 650 | 5 | 47 | 15,200 | 96.7 |
| 197 | 91.0 | 8.0 | Be | 1.0 | 93 | 700 | 3 | 50 | 15,500 | 97.2 |
| 210 | 79.5 | 13.5 | Mn | 7.0 | 99 | 600 | 5 | 68 | 14,200 | 96.3 |
| 221 | 84.3 | 15.2 | Ce | 0.5 | 95 | 650 | 2 | 52 | 15,200 | 97.5 |
| 235 | 84.3 | 15.0 | C | 0.7 | 93 | 600 | 3 | 78 | 14,800 | 95.2 |

Table 5

| Specimen No. | Composition (%) Fe | Ta | V | Nb | Cr | Mo | W | Ni | Cu | Co | Ti | Zr | Si | Al | Ge | Sn | Sb | Bc | Mn | Ce | C | Cold working ratio (%) | Heating temperature (° C) | Heating time (hr) | Coercive force Hc(Oe) | Residual induction Br(G) | Squareness ratio $Br/B_{100}$ (%) |
|---|---|---|---|---|---|---|---|---|---|---|---|---|---|---|---|---|---|---|---|---|---|---|---|---|---|---|---|
| 305 | 89.2 | 5.2 | — | — | — | 4.3 | — | — | — | — | — | 1.0 | — | — | — | - | — | — | — | | 0.1 | 95 | 650 | 3 | 63 | 15,600 | 85.2 |
| 320 | 71.9 | 7.5 | 3.0 | — | — | 15.6 | — | — | — | — | — | — | — | 2.0 | — | — | — | — | — | — | — | 98 | 650 | 2 | 155 | 13,300 | a 90.3 |
| 345 | 62.4 | 12.0 | — | — | 15.2 | — | — | 5.4 | — | — | — | — | — | — | — | — | — | — | 5.0 | — | — | 98 | 600 | 2 | 59 | 15,100 | 97.1 |
| 361 | 46.6 | 15.0 | 1.0 | — | — | 6.0 | — | — | 5.1 | 26.0 | — | — | — | — | — | — | — | 0.3 | — | — | — | 95 | 750 | 1 | 110 | 17,800 | a 91.5 |
| 370 | 44.2 | 18.5 | — | — | — | — | — | 15.0 | — | 20.3 | — | — | — | — | 2.0 | — | — | — | — | — | — | 93 | 550 | 5 | 74 | 15,200 | 93.4 |
| 393 | 58.2 | 10.3 | — | — | — | — | 3.0 | — | 8.5 | 20.0 | — | — | — | — | — | — | — | — | — | — | — | 98 | 700 | 1 | 68 | 17,000 | 95.1 |
| 411 | 65.2 | 8.2 | — | — | — | — | 6.3 | — | 2.0 | 18.3 | — | — | — | — | — | — | — | — | — | — | — | 95 | 700 | 1 | 82 | 16,200 | 92.5 |
| 436 | 76.7 | 11.0 | — | 0.3 | 5.0 | — | — | — | — | 5.0 | 1.0 | — | — | 1.0 | — | — | — | — | — | — | — | 98 | 650 | 2 | 53 | 15,300 | 97.3 |
| 451 | 72.3 | 14.6 | — | 0.1 | — | 3.0 | 3.0 | — | 5.0 | — | — | — | 1.0 | — | — | — | 1.0 | — | — | — | — | 98 | 650 | 3 | 96 | 15,200 | 90.5 |
| 478 | 67.0 | 13.5 | 0.5 | — | 12.0 | — | — | 5.0 | — | — | 1.0 | — | — | — | — | 1.0 | — | — | — | — | — | 95 | 600 | 4 | 83 | 15,000 | 91.6 |
| 490 | 68.7 | 16.3 | — | — | 3.0 | — | — | 10.5 | — | — | — | 1.0 | — | — | — | — | — | 0.5 | — | — | — | 95 | 650 | 3 | 102 | 14,500 | a 90.0 |
| 513 | 73.0 | 6.0 | 2.0 | — | 10.0 | — | — | — | — | — | 0.5 | — | — | — | — | — | 1.5 | — | 7.0 | — | — | 98 | 650 | 3 | 87 | 15,500 | 95.0 |
| 535 | 71.2 | 19.5 | — | 0.05 | — | — | 7.0 | — | — | — | — | 1.0 | — | — | 1.0 | — | — | — | — | 0.2 | — | 98 | 700 | 2 | 95 | 15,300 | 92.3 |
| 561 | 74.5 | 13.0 | — | — | — | — | — | — | — | 10.0 | — | — | 2.0 | — | — | — | — | — | — | 0.5 | — | 98 | 700 | 2 | 54 | 15,500 | 97.0 |
| 575 | 64.7 | 8.6 | — | 0.4 | — | — | 5.0 | — | — | 17.5 | — | — | — | — | — | 0.5 | — | — | 3.0 | — | 0.3 | 85 | 600 | 2 | 71 | 15,700 | 95.5 |
| 590 | 47.5 | 15.3 | 5.0 | 0.2S | — | 3.0 | — | — | 2.5 | 24.5 | — | — | 1.0 | — | — | — | — | — | 1.0 | — | — | 90 | 750 | 0.5 | 126 | 16,200 | a 95.3 |

a $Br/B_{200}$

As understood from the above FIGS. 1 and 2, and Tables 1 to 5, the alloys according to the present invention, that is either Fe-Ta alloys alone or in admixture with 0.01–60 wt. % in total amount of at least one element selected from the group consisting of V, Nb, Cr, Mo, W, Ni, Cu, Co, Ti, Zr, Si, Al, Ge, Sn, Sb, Be, Mn, Ce and C are magnetic alloys having a coercive force of more than 2 oersteds, a high residual induction and an excellent rectangular hysteresis loop when the alloy has been subjected to cold working at a working ratio of more than 50% and then heat treated by heating at a temperature above 400° C.

Furthermore, even if the above magnetic alloy is further heated or subjected to cold working, the rectangular hysteresis loop is not easily transformed. Accordingly, the alloy of the present invention is useful for the manufacture of articles requiring the glass sealing or additional working after a final heat treatment.

As mentioned above, the magnetic properties of the alloy according to the present invention are obtained by subjecting the alloy to cold working at a working ratio of more than 50% and then to a heat treatment by heating it at a temperature above 400° C. Of course, the good rectangular hysteresis loop is obtained even if the cold working and heating are carried out repeatedly.

In the alloys shown in Examples 1 to 3, FIGS. 1 and 2, and Tables 4 and 5, metals having a relatively high purity, such as Nb, Cr, Mo, W, Mn, V, Ti, Al, Si, Ce, C and the like are used. However, even if economically useful and commercially available ferroalloys and Misch metals are used instead of these metals, and if deoxidization and desulfurization are sufficiently effected during the melting, substantially the same magnetic properties and workability as in the case of using the elemental metal can be obtained.

As mentioned above, the alloys of the present invention have an excellent rectangular hysteresis loop and a large coercive force, so that they are suitable as a magnetic material for not only the aforesaid electromagnetic devices requiring the rectangular hysteresis loop but also as a material for a core of a hysteresis motor.

In the present invention, the reason why the composition of the alloy is limited to the ranges as mentioned above is due to the fact that when the composition is within the aforesaid range, the coercive force is more than 2 oersteds, the rectangular hysteresis loop is excellent and the workability is good, but when the composition deviates from this range, the magnetic properties are degraded and the working becomes very difficult so as to be improper to use as a magnetic alloy having a rectangular hysteresis loop as understood from each Example, FIGS. 1 and 2 and Tables 4 and 5.

Thus, the alloy, which consists of 0.5–25 wt. % Ta and the balance of Fe, has a coercive force of more than 2 oersteds and an excellent rectangular hysteresis loop. The alloy suffers only a small amount of degradation of the magnetic properties even by heating at an elevated temperature and has excellent forgeability and workability. The addition of Nb, Cr, Mo, W, Ni, Cu, Co, Ti, Zr, Al, Sn, Sb, Be, Mn, Ce and/or C to this Fe-Ta alloy will improve the rectangular hysteresis loop and coercive force. The addition of Ti, Al, Si, Ge or V to this Fe-Ta alloy reduces the amount of degradation of the magnetic properties by heating at an elevated temperature. The addition of Ti, Cr or Ni to this Fe-Ta alloy improves the forgeability and workability.

We claim:

1. A rectangular hysteresis magnetic alloy consisting of 0.5 to 25% by weight of tantalum and the balance of iron, said alloy being cold worked and then heat treated and having a coercive force of more than 2 oersteds, a residual induction of more than 12700 gauss and a squareness ratio of more than 80%.

2. A rectangular hysteresis magnetic alloy according to claim 1, wherein the alloy has been cold worked at a working ratio of more than 50% and heat treated at a temperature of at least 400° C.

3. A rectangular hysteresis magnetic alloy as defined in claim 1, wherein said tantalum content is 2 to 20% by weight and said worked and heat treated alloy has a squareness ratio of more than 90%, a coercive force of 2–300 oersteds, and a residual induction of more than 12700 gauss.

4. A rectangular hysteresis magnetic alloy according to claim 3, wherein the alloy has been cold worked at a working ratio of more than 50% and heat treated at a temperature of at least 400° C.

5. A rectangular hyeresis magnetic alloy, consisting of 0.5 to 25% by weight of tantalum, 0.01 to 60% by weight in total amount of at least one element selected from the group of subingredients consisting of 0 to 10% of vanadium, 0 to 0.5% of niobium, 0 to 35% of chromium, 0 to 20% of molybdenum, 0 to 20% of tungsten, 0 to 25% of nickel, 0 to 25% of copper, 0 to 40% of cobalt, 0 to 5% of titanium, 0 to 5% of zirconium, 0 to 5% of silicon, 0 to 10% of aluminum, 0 to 5% of germanium, 0 to 5% of tin, 0 to 5% of antimony, 0 to 3% of beryllium, 0 to 15% of manganese, 0 to 2% of cerium and 0 to 1.5% of carbon, and the balance of iron, said alloy being cold worked and then heat treated and having a coercive force of more than 2 oersteds, a residual induction of more than 12700 gauss and a squareness ratio of more than 80%.

6. A rectangular hysteresis magnetic alloy according to claim 5, wherein the alloy has been cold worked at a working ratio of more than 50% and heat treated at a temperature of at least 400° C.

7. A rectangular hysteresis magnetic alloy according to claim 5, wherein said tantalum content is 2 to 20% by weight and wherein the group of subingredients consists of 0 to 7% of vanadium, 0 to 0.5% of niobium, 0 to 20% of chromium, 0 to 10% of molybdenum, 0 to 10% of tungsten, 0 to 20% nickel, 0 to 7% of copper, 0 to 30% of cobalt, 0 to 3% of titanium, 0 to 3% of zirconium, 0 to 3% of silicon, 0 to 3% of aluminum, 0 to 3% of germanium, 0 to 3% of tin, 0 to 3% of antimony, 0 to 2% of beryllium, 0 to 7% of manganese, 0 to 1.5% of cerium and 0 to 1% of carbon.

8. A rectangular hysteresis magnetic alloy according to claim 7, wherein the alloy has been cold worked at a working ratio of more than 50% and heat treated at a temperature of at least 400° C.

9. A rectangular hysteresis magnetic alloy according to claim 5, wherein the alloy has a coercive force of 2–300 oersteds, a residual induction of more than 12700 gauss and a squareness ratio of more than 80%.

* * * * *